US007451457B2

(12) United States Patent
Estrop

(10) Patent No.: US 7,451,457 B2
(45) Date of Patent: Nov. 11, 2008

(54) FACILITATING INTERACTION BETWEEN VIDEO RENDERERS AND GRAPHICS DEVICE DRIVERS

(75) Inventor: Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 10/400,040

(22) Filed: Mar. 25, 2003

(65) Prior Publication Data

US 2003/0195998 A1      Oct. 16, 2003

Related U.S. Application Data

(60) Provisional application No. 60/413,060, filed on Sep. 24, 2002, provisional application No. 60/372,880, filed on Apr. 15, 2002.

(51) Int. Cl.
  *G06F 9/00*      (2006.01)
(52) U.S. Cl. .................. 719/323; 345/428; 345/581; 345/629
(58) Field of Classification Search .................. 719/323, 719/321, 327; 345/419, 629, 522, 428, 581
See application file for complete search history.

(56) References Cited

U.S. PATENT DOCUMENTS

| | | | |
|---|---|---|---|
| 4,463,372 A | 7/1984 | Bennett et al. | |
| 4,601,055 A | 7/1986 | Kent | |
| 4,639,763 A | 1/1987 | Willis et al. | |
| 4,866,637 A | 9/1989 | Gonzalez-Lopez et al. | |
| 5,014,327 A | 5/1991 | Potter et al. | |
| 5,179,641 A | 1/1993 | Comins et al. | |
| 5,218,674 A * | 6/1993 | Peaslee et al. | ............... 345/562 |
| 5,235,432 A | 8/1993 | Creedon et al. | |

(Continued)

FOREIGN PATENT DOCUMENTS

EP      0600204      6/1994

(Continued)

OTHER PUBLICATIONS

Birn, Jeremy, "Digital Lighting & Rendering", 2001, <http://www.3drender.com/glossary/fields.htm> 2 pages.

(Continued)

*Primary Examiner*—Thomas Lee
*Assistant Examiner*—Phuong N Hoang
(74) *Attorney, Agent, or Firm*—Lee & Hayes, PLLC

(57) ABSTRACT

Facilitating interaction may be enabled through communication protocols and/or APIs that permit information regarding image processing capabilities of associated graphics hardware to be exchanged between graphics device drivers and video renders. In a first exemplary media implementation, electronically-executable instructions thereof for a video renderer precipitate actions including: issuing a query from a video render towards a graphics device driver, the query requesting information relating to process amplifier (ProcAmp) capabilities; and receiving a response at the video renderer from the graphics device driver, the response including the requested information relating to ProcAmp capabilities. In a second exemplary media implementation, a graphics device driver precipitates actions including: receiving a query at the graphics device driver from a video renderer, the query requesting information relating to ProcAmp capabilities; and sending a response to the video renderer from the graphics device driver, the response including the requested information that relates to ProcAmp capabilities.

19 Claims, 6 Drawing Sheets

U.S. PATENT DOCUMENTS

| | | | |
|---|---|---|---|
| 5,325,448 | A | 6/1994 | Katayama et al. |
| 5,508,812 | A | 4/1996 | Stevenson et al. |
| 5,565,994 | A | 10/1996 | Eschbach |
| 5,577,125 | A | 11/1996 | Salahshour et al. |
| 5,602,943 | A | 2/1997 | Velho et al. |
| 5,715,459 | A | 2/1998 | Celi, Jr. et al. |
| 5,742,797 | A | 4/1998 | Celi, Jr. et al. |
| 5,757,386 | A | 5/1998 | Celi, Jr. et al. |
| 5,793,371 | A | 8/1998 | Deering |
| 5,870,503 | A | 2/1999 | Kumashiro |
| 5,872,956 | A | 2/1999 | Beal et al. |
| 5,892,847 | A | 4/1999 | Johnson |
| 5,898,779 | A | 4/1999 | Squilla et al. |
| 5,936,632 | A | 8/1999 | Cunniff et al. |
| 5,940,141 | A | 8/1999 | Faroudja et al. |
| 5,982,453 | A | 11/1999 | Willis |
| 6,034,733 | A | 3/2000 | Balram et al. |
| 6,047,295 | A | 4/2000 | Endicott |
| 6,064,739 | A | 5/2000 | Davis |
| 6,072,873 | A | 6/2000 | Bewick |
| 6,144,390 | A | 11/2000 | Ensor |
| 6,195,098 | B1 * | 2/2001 | Brittain et al. ............... 345/422 |
| 6,205,492 | B1 * | 3/2001 | Shaw et al. ................. 719/321 |
| 6,208,350 | B1 | 3/2001 | Herrera |
| 6,212,574 | B1 | 4/2001 | O'Rourke et al. |
| 6,246,768 | B1 | 6/2001 | Kim |
| 6,262,773 | B1 | 7/2001 | Westerman |
| 6,269,484 | B1 | 7/2001 | Simsic et al. |
| 6,295,068 | B1 | 9/2001 | Peddada et al. |
| 6,307,559 | B1 | 10/2001 | Hancock et al. |
| 6,317,165 | B1 | 11/2001 | Balram et al. |
| 6,323,875 | B1 | 11/2001 | Millman et al. |
| 6,329,984 | B1 * | 12/2001 | Boss et al. .................. 715/723 |
| 6,331,874 | B1 | 12/2001 | de Garrido et al. |
| 6,332,045 | B1 | 12/2001 | Sawada et al. |
| 6,353,438 | B1 * | 3/2002 | Van Hook et al. ........... 345/552 |
| 6,359,631 | B2 * | 3/2002 | DeLeeuw .................. 345/629 |
| 6,369,855 | B1 | 4/2002 | Chauvel |
| 6,370,198 | B1 | 4/2002 | Washino |
| 6,466,226 | B1 | 10/2002 | Watson et al. |
| 6,496,183 | B1 * | 12/2002 | Bar-Nahum ................ 345/419 |
| 6,509,930 | B1 | 1/2003 | Hirano et al. |
| 6,567,098 | B1 * | 5/2003 | D'Amora .................... 345/611 |
| 6,573,905 | B1 | 6/2003 | MacInnis et al. |
| 6,587,129 | B1 | 7/2003 | Lavendel et al. |
| 6,611,269 | B1 | 8/2003 | Uehara et al. |
| 6,654,022 | B1 * | 11/2003 | Egan .......................... 345/557 |
| 6,690,427 | B2 | 2/2004 | Swan |
| 6,753,878 | B1 | 6/2004 | Heirich et al. |
| 6,788,312 | B1 | 9/2004 | Azar et al. |
| 6,806,982 | B2 * | 10/2004 | Newswanger et al. ......... 359/35 |
| 6,831,999 | B2 | 12/2004 | Haikin |
| 6,833,837 | B2 | 12/2004 | Hei La |
| 6,859,235 | B2 | 2/2005 | Walters |
| 6,885,374 | B2 | 4/2005 | Doyle et al. |
| 6,928,196 | B1 | 8/2005 | Bradley et al. |
| 6,940,557 | B2 | 9/2005 | Handjojo et al. |
| 6,952,215 | B1 | 10/2005 | Devins et al. |
| 7,151,863 | B1 | 12/2006 | Bradley et al. |
| 7,158,668 | B2 | 1/2007 | Munsil et al. |
| 7,180,525 | B1 | 2/2007 | Naegle |
| 7,219,352 | B2 | 5/2007 | Estrop |
| 2002/0063801 | A1 | 5/2002 | Richardson |
| 2002/0145610 | A1 | 10/2002 | Barilovits |
| 2002/0145611 | A1 | 10/2002 | Dye et al. |
| 2002/0154324 | A1 | 10/2002 | Tay et al. |
| 2003/0117638 | A1 | 6/2003 | Ferlitsch |
| 2003/0158979 | A1 | 8/2003 | Tateyama et al. |
| 2004/0054689 | A1 | 3/2004 | Salmonsen et al. |
| 2005/0050554 | A1 | 3/2005 | Martyn |

FOREIGN PATENT DOCUMENTS

| | | |
|---|---|---|
| EP | 0651577 A2 | 5/1995 |
| JP | 2000311240 | 3/2000 |
| JP | 2001084154 | 3/2001 |
| WO | WO 01/61992 | 8/2001 |
| WO | WO 02/067577 | 8/2002 |

OTHER PUBLICATIONS

Marjanovic, Matthew, "Chroma Subsampling Standards", Mar. 31, 2003, <http://www.mir.com/DMG/chroma.html> 5 pages.

"YUV", available at http://en.wikipedia.org/wiki/YUV.

"GPU: Changes Everything", available at http://www.nvidia.com/object/gpu.html>.

Stephen Mann, "The Graphics Rendering Pipeline", 1997, available at <http://medialab.di.unipi.it/web/IUM/Waterloo/node7.html>.

"Parallel Processing", available at http://www.google.com/search?hl=en&lr=&oi=defmore&q=define:parallel+processing.

Foreign Search Report for EP 03 00 5836, dated Dec. 7, 2004, 3 pages.

Foreign Search Report for EP 03 008706, dated Dec. 9, 2004, 3 pages.

U.S. Appl. No. 10/273,505, filed Oct. 18, 2002, titled "Methods and Apparatuses for Facilitating Processing Of Interlaced Video Images For Progressive Video Displays", Stephen Estrop, 73 pages.

Introductory page entitled "Deinterlacing and Frame-Rate Conversion," MSDN Library technical literature, available at <http://msdn.microsoft.com/library/default.asp?url=/library/en-us/graphics/hh/graphics/dxvaguide_0t2f.asp>, accessed on Feb. 2, 2004, 1 page.

U.S. Appl. No. 10/987,378, filed Nov. 12, 2004, titled "Image Processing Using Linear Light Values And Other Image Processing Improvements", Munsil et al., 95 pages.

U.S. Appl. No. 10/902,325, filed Jul. 29, 2004, titled "Strategies for Processing Image Information Using a Color Information Data Structure", Evans et al., 94 pages.

U.S. Appl. No. 10/694,144, filed Oct. 27, 2003, titled "Bandwidth-Efficient Processing of Video Images", Steven Estrop, 60 pages.

Michael Blome, "Introducing Some New Video Mixing Renderer Sample Applications," dated Apr. 2003, available at <http://msdn.microsoft.com/library/default.asp?url=/library/en-us/dnwmt/html/introducingsomenewvideomixingrenderersampleapplica.asp>, accessed on Feb. 2, 2004, 20 pages.

Wolfgang F. Engel, Direct3D ShaderX: Vertex and Pixel Shader Tips and Tricks, Wordware Publishing, Inc., 2002, pp. 72-124.

Charles Poynton, *Digital Video and HDTV: Algorithms and Interfaces*, Morgan Kaufmann Publishers, 2003, table of contents, pp. xi to xxiii, and chapter 24, pp. 281-300.

Yahya H. Mirza and Henry da Costa, "DirectX 9.0: Introducing the New Managed3D Graphics API in the .NET Framework," from the Apr. 2003 issue of MSDN Magazine, available at <http://msdn.microsoft.com/library/default.asp?url=/msdnmag/issues/03/07/DirectX90/toc.asp>, accessed on Feb. 2, 2004, 10 pages.

Adrian Ford and Alan Roberts, "Colour Space Conversions," dated Aug. 11, 1998, available at <http://www.poynton.com/PDFs/coloureq.pdf>, accessed on Jul. 28, 2004, 31 pages.

Charles Poynton, "Frequently Asked Questions about Gamma," 1998, available at <http://www.poynton.com/PDFs/GammaFAQ.pdf>, accessed on Jul. 28, 2004, 12 pages.

Charles Poynton, "Frequently Asked Questions about Color," 1997, available at <http://www.poynton.com/PDFs/ColorFAQ.pdf>, accessed on Jul. 28, 2004, 24 pages.

Don Musil and Stacey Spears, "The Chroma Upsampling Error and the 4:2:0 Interlaced Chroma Problem," Secrets of Home Theater and High Fidelity, DVD Benchmark, accessible at <<http://www.hometheaterhifi.com/volume_8_2/dvd-benchmark-special-report-chroma-bug-4-2001.html>>, Apr. 2001, Dec. 2002, Jan. 2003, 20 pages.

"YCbCr to RGB Considerations," Intersil Application Note, AN9717, Mar. 1997, available at <<http://www.intersil.com/data/an/an9717.pdf>>, 2 pages.

"Understanding Analog Video Signals," Dallas Maxim, Application Note 1184, available at <<http://www.maxim-ic.com/appnotes.cfm/appnote_number/1184>>, Sep. 4, 2002, 12 pages.

Introductory page entitled "An Introduction to QuickTimeTM," available at <<http://developer.apple.com/quicktime/qttutorial/overview.html>>, accessed on Jan. 13, 2005, 2 pages.

U.S. Appl. No. 10/273,505, Estrop.

Mark G. Rawlins, "A Standards Solution to Your Graphics Problems," Graphic Software Systems, Inc., Frontiers in Computer Graphics, Proceedings of Computer Graphics Tokyo '84, copyright by Springer-Verlag Tokyo 1985, pp. 375-416.

David Union, "Accessing Device Drivers from C#," Windows Developer Magazine, www.wd-mag.com, vol. 13, No. 4, Apr. 2002, pp. 19, 20, 22, 23, 26, 27.

Hui Xin-biao, Dong Yong-qiang, Qi Dan-qing, "Implementation of MPEG stream analyzer," Journal of China Institute of Communications, vol. 22, No. 10, Oct. 2001, pp. 57-62.

He Yong-yi, Xia Jun-sheng, Fang Ming-lun, "Development and Application of the NT Device Driver in CNC System," Journal of Shanghai University (English Edition), ISSN 1007-6417, vol. 5, No. 4 (Dec. 2001), pp. 317-321.

Search Report completed Sep. 4, 2007, mailed Sep. 14, 2007, from counterpart Malaysian Patent Application No. PI20031383, 1 page.

* cited by examiner

FACILITATING INTERACTION BETWEEN VIDEO RENDERERS AND GRAPHICS DEVICE DRIVERS

RELATED PATENT APPLICATIONS

This U.S. Non-provisional Application for Letters Patent claims the benefit of priority from (i) co-pending U.S. Provisional Application for Letters Patent Ser. No. 60/372,880 (filed Apr. 15, 2002) and (ii) co-pending U.S. Provisional Application for Letters Patent Ser. No. 60/413,060 (filed Sep. 24, 2002).

Specifically, this U.S. Non-provisional Application for Letters Patent claims the benefit of priority from, and hereby incorporates by reference herein the entire disclosure of, co-pending U.S. Provisional Application for Letters Patent Ser. No. 60/413,060, filed Sep. 24, 2002, and titled "Methods for Hardware Accelerating the 'ProcAmp' Adjustments of Video Images on a Computer Display".

Specifically, this U.S. Non-provisional Application for Letters Patent also claims the benefit of priority from, and hereby incorporates by reference herein the entire disclosure of, co-pending U.S. Provisional Application for Letters Patent Ser. No. 60/372,880, filed Apr. 15, 2002, and titled "Methods and Apparatuses for Facilitating De-Interlacing of Video Images".

This U.S. Non-provisional Application for Letters Patent is related by subject-matter to U.S. Pat. No. 7,219,352, issued on May 15, 2007, and titled "Methods And Apparatuses For Facilitating Processing Of Interlaced Video Images For Progressive Video Displays". This U.S. Pat. No. 7,219,352 is also hereby incorporated by reference herein in its entirety.

TECHNICAL FIELD

This disclosure relates in general to processing image/graphics data for display and in particular, by way of example but not limitation, to facilitating interaction between video renderers and graphics device drivers using a protocol for communicating information therebetween, as well as consequential functionality. Such information may include queries, responses, instructions, etc. that are directed to, for example, ProcAmp adjustment operations.

BACKGROUND

In a typical computing environment, a graphics card or similar is responsible for transferring images onto a display device and for handling at least part of the processing of the images. For video images, a graphics overlay device and technique is often employed by the graphics card and the overall computing device. For example, to display video images from a DVD or Internet streaming source, a graphics overlay procedure is initiated to place and maintain the video images.

A graphics overlay procedure selects a rectangle and a key color for establishing the screen location at which the video image is to be displayed. The rectangle can be defined with a starting coordinate for a corner of the rectangle along with the desired height and width. The key color is usually a rarely seen color such as bright pink and is used to ensure that video is overlain within the defined rectangle only if the video is logically positioned at a topmost layer of a desktop on the display screen.

In operation, as the graphics card is providing pixel colors to a display device, it checks to determine if a given pixel location is within the selected graphics overlay rectangle. If not, the default image data is forwarded to the display device. If, on the other hand, the given pixel location is within the selected graphics overlay rectangle, the graphics card checks to determine whether the default image data at that pixel is equal to the selected key color. If not, the default image data is forwarded to the display device for the given pixel. If, on the other hand, the color of the given pixel is the selected key color, the graphics card forwards the video image data to the display device for that given pixel.

There are, unfortunately, several drawbacks to this graphics overlay technique. First, there is usually only sufficient hardware resources for a single graphics overlay procedure to be in effect at any one time. Regardless, reliance on the graphics overlay technique always results in constraints on the number of possible simultaneous video displays as limited by the hardware. Second, the pink or other key color sometimes becomes visible (i.e., is displayed on an associated display device) when the window containing the displayed video is moved vigorously around the desktop on the display screen.

Third, a print screen command does not function effectively inasmuch as the video image that is displayed on the display device is not captured by the print screen command. Instead, the key color is captured by the print screen command, so the printed (or copied and pasted) image includes a solid rectangle of the key color where the video is displayed on the display device.

Another technique for displaying video images entails using the host microprocessor to perform video adjustments prior to transferring the video image to the graphics processor for forwarding to the display device. There are also several drawbacks to this host processor technique. First, the host microprocessor and associated memory subsystem of a typical computing environment is not optimized for the processing of large video images. Consequently, the size and number of video images that can be displayed are severely restricted. Second, for the host microprocessor to work efficiently, the video image must reside in memory that is directly addressable by the host microprocessor. As a result, other types of hardware acceleration, such as decompression and/or de-interlacing, cannot be performed on the video image.

In short, previous techniques such as the graphics overlay procedure and reliance on the host processor result in visual artifacts, are too slow and/or use memory resources inefficiently, are hardware limited, constrain video presentation flexibility, and/or do not enable a fully-functional print screen command. Accordingly, there is a need for schemes and/or approaches for remedying these and other deficiencies by, inter alia, facilitating interaction between video renderers and graphics device drivers.

SUMMARY

Facilitating interaction between video renderers and graphics device drivers may be enabled through communication protocols and/or application programming interfaces (APIs) that permit information regarding image processing capabilities of associated graphics hardware to be exchanged between a graphics device driver and a video render. Image processing capabilities include video processing capabilities; video processing capabilities include by way of example, but not limitation, process amplifier (ProcAmp) control adjustments, de-interlacing, aspect ratio corrections, color space conversions, frame rate conversions, vertical or horizontal mirroring, and alpha blending.

In an exemplary method implementation, a method facilitates interaction between one or more video renderers and at least one graphics device driver, the method including actions of: querying, by a video render of the one or more video renderers, the at least one graphics device driver regarding video processing capabilities; and informing, by the at least one graphics device driver, the video render of at least a subset of video processing capabilities that the at least one graphics device driver can offer to the video renderer.

In a first exemplary media implementation, electronically-executable instructions thereof for a video renderer precipitate actions including: issuing a query from a video render towards a graphics device driver, the query requesting information relating to ProcAmp capabilities; and receiving a response at the video renderer from the graphics device driver, the response including the requested information relating to ProcAmp capabilities.

In a second exemplary media implementation, electronically-executable instructions thereof for a graphics device driver precipitate actions including: receiving a query at a graphics device driver from a video renderer, the query requesting information relating to ProcAmp capabilities; and sending a response to the video renderer from the graphics device driver, the response including the requested information that relates to ProcAmp capabilities.

In an exemplary system implementation, a system facilitates interaction between a video renderer and a graphics device driver, the system including: video rendering logic that is adapted to prepare queries that request information relating to ProcAmp capabilities that can be applied to video that is to be displayed; and graphics device driving logic that is adapted to prepare responses that indicate what ProcAmp capabilities can be applied to video that is to be displayed.

Other method, system, apparatus, protocol, media, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Exemplary Video Processing Pipelines and ProcAmp Adjustments

Exemplary Video Processing Pipeline with a ProcAmp Adjustment

Figure 1:
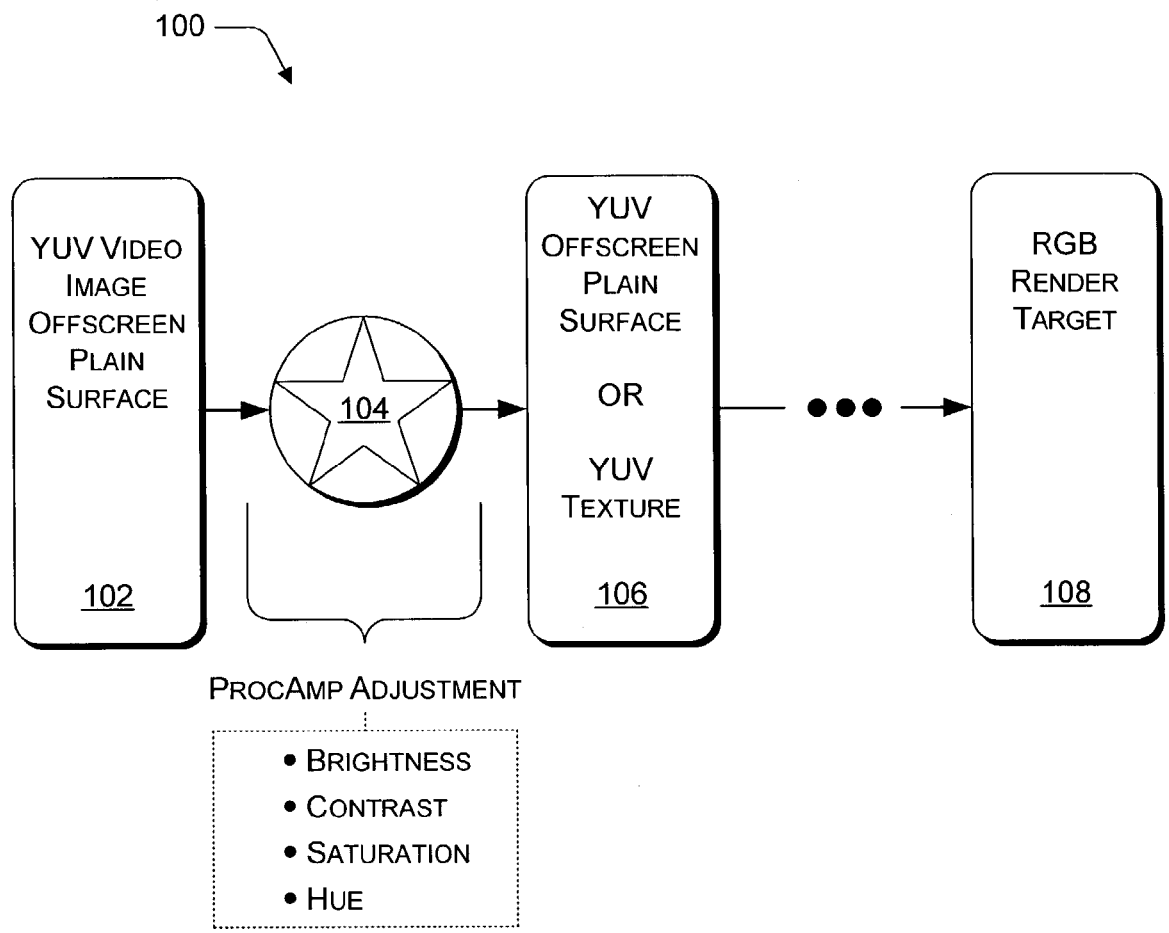
FIG. 1 is a first video processing pipeline that includes a ProcAmp adjustment operation.

FIG. 1 is a first video processing pipeline 100 that includes a ProcAmp adjustment operation 104. First video processing pipeline 100 may be implemented using graphics hardware such as a graphics card. It includes (i) three image memory blocks 102, 106, and 108 and (ii) at least one image processing operation 104. Image memory block 102 includes a YUV video image offscreen plain surface. Image processing operation 104, which comprises a ProcAmp adjustment operation 104 as illustrated, is applied to image memory block 102 to produce image memory block 106. Image memory block 106 includes a YUV offscreen plain surface or a YUV texture, depending on the parameters and capabilities of the graphics hardware that is performing the image adjustment operations.

After one or more additional image processing operations (not explicitly shown in FIG. 1), the graphics hardware produces image memory block 108, which includes an RGB render target. The RGB render target of image memory block 108 may be displayed on a display device by the graphics hardware without additional image processing operations. Also, image memory block 108 includes image data for each pixel of a screen of a display device such that no image data need be retrieved from other memory during the forwarding of the image data from image memory block 108 to the display device.

ProcAmp adjustment operation 104 refers to one or more process amplifier (ProcAmp) adjustments. The concept of ProcAmp adjustments originated when video was stored, manipulated, and displayed using analog techniques. However, ProcAmp adjustment operations 104 may now be performed using digital techniques. Such ProcAmp adjustment operations 104 may include one or more operations that are directed to one or more of at least the following video properties: brightness, contrast, saturation, and hue.

Exemplary ProcAmp-Related Video Properties

The following descriptions of brightness, contrast, saturation, and hue, in conjunction with possible and/or suggested settings for manipulating their values, are for an exemplary described implementation. Other ProcAmp adjustment guidelines may alternatively be employed.

Brightness: Brightness is alternatively known as "Black Set"; brightness should not be confused with gain (contrast). It is used to set the 'viewing black' level in each particular viewing scenario. Functionally, it adds or subtracts the same number of quantizing steps (bits) from all the luminance words in a picture. It can and generally does create clipping situations if the offset plus some luminance word is less than 0 or greater than full range. It is usually interactive with the contrast control.

Contrast: Contrast is the 'Gain' of the picture luminance. It is used to alter the relative light to dark values in a picture. Functionally, it is a linear positive or negative gain that maps the incoming range of values into a smaller or a larger range. The set point (e.g., no change as gain changes) is normally equal to a code 0, but it is more appropriately the code word that is associated with a nominal viewing black set point. The contrast gain structure is usually a linear transfer ramp that passes through this set point. Contrast functions usually involve rounding of the computed values if the gain is set is anything other than 1-to-1, and that rounding usually includes programmatic dithering to avoid visible artifact generation 'contouring'.

Saturation: Saturation is the logical equivalent of contrast. It is a gain function, with a set point around "zero chroma" (e.g., code 128 on YUV or code 0 on RGB in a described implementation).

Hue: Hue is a phase relationship of the chrominance components. Hue is typically specified in degrees, with a valid range from −180 through +180 and a default of 0 degrees. Hue in component systems (e.g., YUV or RGB) is a three part variable in which the three components change together in order to maintain valid chrominance/luminance relationships.

Exemplary ProcAmp-Related Adjusting in the YUV Color Space

The following descriptions for processing brightness, contrast, saturation, and hue in the YUV color space, in conjunction with possible and/or suggested settings for manipulating their values, are for an exemplary described implementation. Other adjustment guidelines may alternatively be employed. Generally, working in the YUV color space simplifies the calculations that are involved for ProcAmp adjustment control of a video stream.

Y Processing: Sixteen (16) is subtracted from the Y values to position the black level at zero. This removes the DC offset so that adjusting the contrast does not vary the black level. Because Y values may be less than 16, negative Y values should be supported at this point in the processing. Contrast is adjusted by multiplying the YUV pixel values by a constant. (If U and V are adjusted, a color shift will result whenever the contrast is changed.) The brightness property value is added (or subtracted) from the contrast-adjusted Y values; this prevents a DC offset from being introduced due to contrast adjustment. Finally, the value 16 is added back to reposition the black level at 16. An exemplary equation for the processing of Y values is thus:

$$Y'=((Y-16)\times C)+B+16,$$

where C is the Contrast value and B is the Brightness value.

UV Processing: One hundred twenty-eight (128) is first subtracted from both U and V values to position the range around zero. The hue property alone is implemented by mixing the U and V values together as follows:

$$U'=(U-128)\times Cos(H)+(V-128)\times Sin(H), \text{ and}$$

$$V'=(V-128)\times Cos(H)-(U-128)\times Sin(H),$$

where H represents the desired Hue angle.

Saturation is adjusted by multiplying both U and V by a constant along with the saturation value. Finally, the value 128 is added back to both U and V. The combined processing of Hue and Saturation on the UV data is thus:

$$U'=(((U-128)\times Cos(H)+(V-128)\times Sin(H))\times C\times S)+128,$$
$$\text{and}$$

$$V'=(((V-128)\times Cos(H)-(U-128)\times Sin(H))\times C\times S)+128,$$

where C is the Contrast value as in the Y' equation above, H is the Hue angle, and S is the Saturation.

Exemplary Video Processing Pipeline with Two Processing Operations

Figure 2:
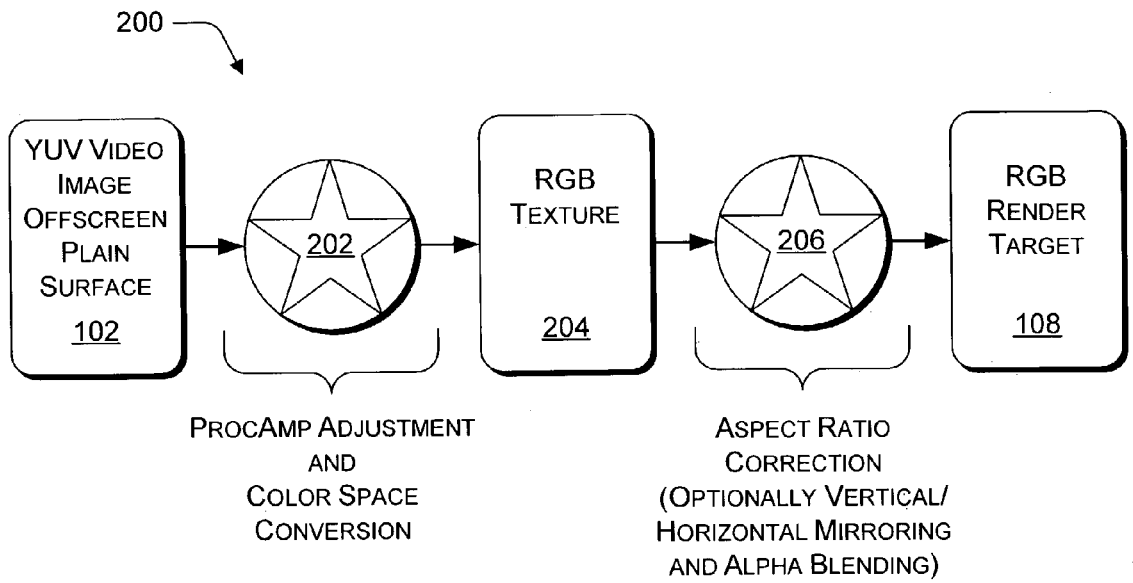
FIG. 2 is a second video processing pipeline that includes two video processing operations to arrive at an RGB render target.

FIG. 2 is a second video processing pipeline 200 that includes two video processing operations 202 and 206 to arrive at RGB render target 108. Second video processing pipeline 200 includes (i) three image memory blocks 102, 204, and 108 and (ii) two image processing operations 202 and 206.

For second video processing pipeline 200 generally, image memory block 204 includes an RGB texture. Image memory block 204 results from image memory block 102 after application of image processing operation 202. Image memory block 108 is produced from image memory block 204 after image processing operation 206.

Other image processing operations, in addition to a ProcAmp control adjustment, may be performed. For example, any one or more of the following exemplary video processing operations may be applied to video image data prior to its display on a screen of a display device:

1. ProcAmp control adjustments;
2. De-interlacing;
3. Aspect ratio correction;
4. Color space conversion; and
5. Vertical or horizontal mirroring and alpha blending.

When possible, the desired video (and/or other image) processing operations are combined into as few operations as possible so as to reduce the overall memory bandwidth that is consumed while processing the video images. The degree to which the processing operations can be combined is generally determined by the capabilities of the graphics hardware. Typically, color space conversion processing and aspect ratio correction processing are applied to many, if not most, video streams. However, vertical/horizontal mirroring and alpha blending are applied less frequently.

For second video processing pipeline 200, ProcAmp adjustment processing and color space conversion processing are combined into image processing operation 202. Aspect ratio correction processing is performed with image processing operation 206. Optionally, vertical/horizontal mirroring and/or alpha blending may be combined into image processing operation 206. As illustrated, the graphics hardware that is implementing second video processing pipeline 200 uses two image processing operations and three image memory blocks to produce image memory block 108 as the RGB render target. However, some graphics hardware may be more efficient.

Exemplary Video Processing Pipeline with One Processing Operation

Figure 3:
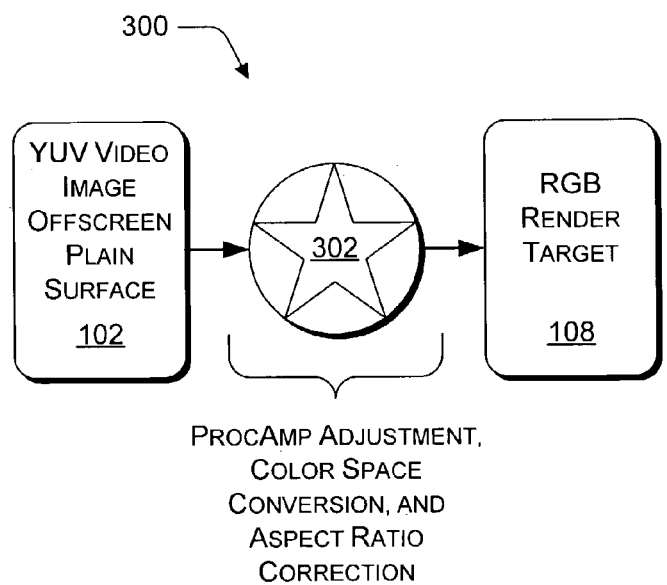
FIG. 3 is a third video processing pipeline that includes one video processing operation to arrive at an RGB render target.

FIG. 3 is a third video processing pipeline 300 that includes one video processing operation 302 to arrive at an RGB render target 108. Generally, third video processing pipeline 300 is implemented with graphics hardware using one image processing operation 302 and two image memory blocks 102 and 108. Specifically, image memory block 108 is produced from image memory block 102 via image processing operation 302. Image processing operation 302, as illustrated, includes multiple video processing operations as described below.

Third video processing pipeline 300 is shorter than second video processing pipeline 200 (of FIG. 2) because image processing operation 302 combines ProcAmp adjustment processing, color space conversion processing, and aspect ratio correction processing. The number of stages in a given video processing pipeline is therefore dependent on the number and types of image processing operations that are requested by software (e.g., an application, an operating system component, etc.) displaying the video image as well as the capabilities of the associated graphics hardware. Exemplary software, graphics hardware, and so forth are described further below with reference to FIG. 4.

Exemplary Video-Related Software and Graphics Hardware

Figure 4:
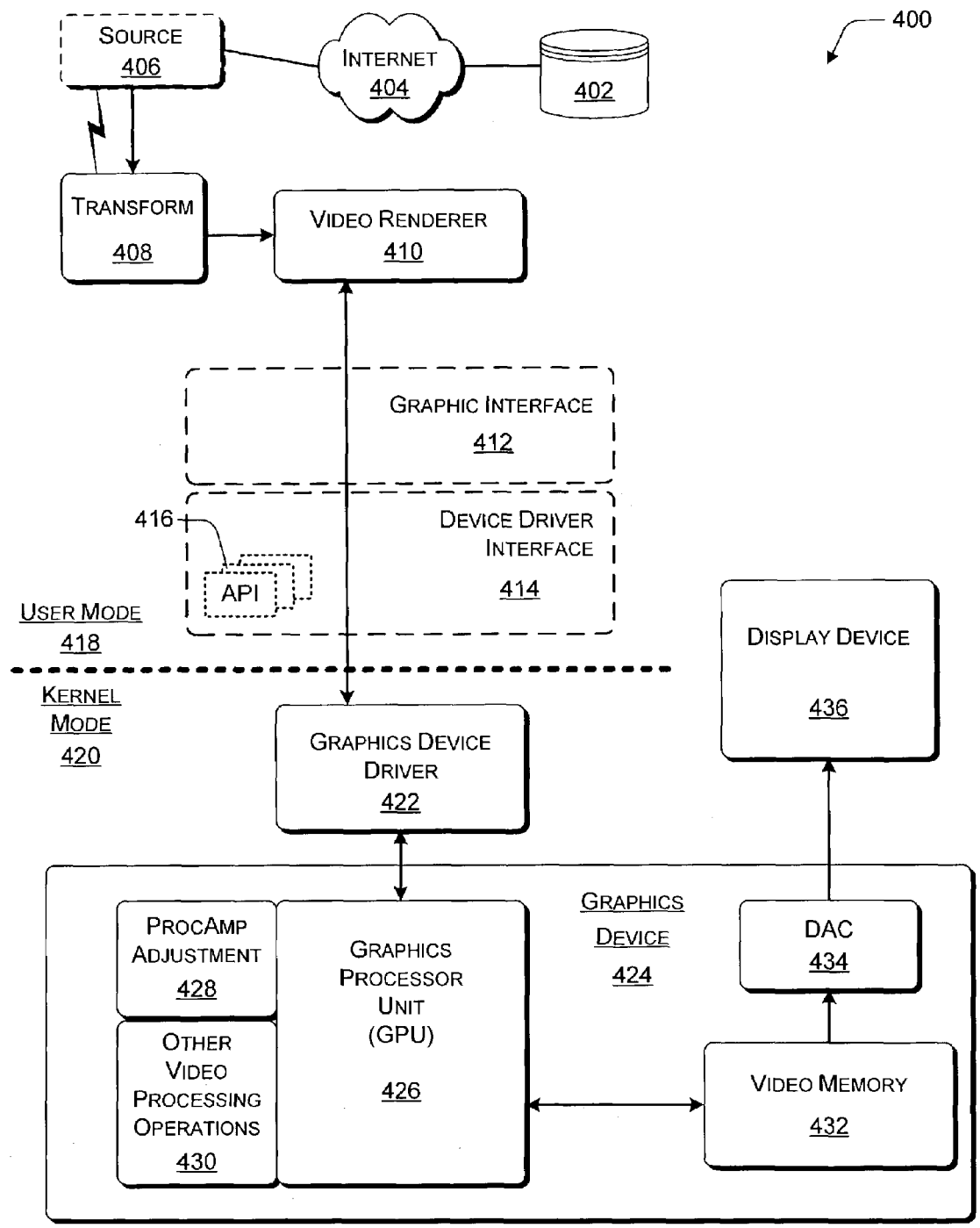
FIG. 4 is a block diagram that illustrates certain functional elements of a computing or other electronic device that is configured to facilitate interaction between video renderers and graphics device drivers.

FIG. 4 is a block diagram 400 that illustrates certain functional elements of a computing or other electronic device that is configured to facilitate interaction between a video renderer 410 and a graphics device driver 422. These various exemplary elements and/or functions are implementable in hardware, software, firmware, some combination thereof, and so forth. Such hardware, software, firmware, some combination thereof, and so forth are jointly and separately referred to herein generically as logic.

The configuration of block diagram 400 is only an example of a video data processing apparatus or system. It should be understood that one or more of the illustrated and described elements and/or functions may be combined, rearranged, augmented, omitted, etc. without vitiating an ability to facilitate interaction between video renderers and graphics device drivers.

Apparatus or system 400 includes transform logic 408, which, for example, may include instructions performed by a central processing unit (CPU), a graphics processing unit, and/or a combination thereof. Transform logic 408 is configured to receive coded video data from at least one source 406. The coded video data from a source 406 is coded in some manner (e.g., MPEG-2, etc.), and transform logic 408 is configured to decode the coded video data.

By way of example, source 406 may include a magnetic disk and related disk drive, an optical disc and related disc drive, a magnetic tape and related tape drive, solid-state memory, a transmitted signal, a transmission medium, or other like source configured to deliver or otherwise provide the coded video data to transform logic 408. Additional examples of source 406 are described below with reference to FIG. 7. In certain implementations, source 406 may include multiple source components such as a network source and remote source. As illustrated, source 406 includes Internet 404 and a remote disk-based storage 402.

The decoded video data that is output by transform logic 408 is provided to at least one video renderer 410. By way of example but not limitation, video renderer 410 may be realized using the Video Mixer and Renderer (VMR) of a Microsoft® Windows® Operating System (OS). In a described implementation, video renderer 410 is configured to aid transform logic 408 in decoding the video stream, to cause video processing operations to be performed, to blend any other auxiliary image data such as closed captions (CCs) or DVD sub-picture images with the video image, and so forth. And, at the appropriate time, video renderer 410 submits or causes submission of the video image data to graphics interface logic 412 for eventual display on a display device 436.

The resulting rendered video data is thus provided to graphic interface logic 412. By way of example but not limitation, graphic interface logic 412 may include, for example, DirectDraw®, Direct3D®, and/or other like logic. Graphic interface logic 412 is configured to provide an interface between video renderer 410 and a graphics device 424. As illustrated, graphics device 424 includes a graphics processor unit (GPU) 426, a video memory 432, and a digital-to-analog converter (DAC) 434. By way of example but not limitation, graphics device 424 may be realized as a video graphics card that is configured within a computing or other electronic device.

The image data output by graphic interface logic 412 is provided to a graphics device driver 422 using a device driver interface (DDI) 414. In FIG. 3, device driver interface 414 is depicted as having at least one application programming interface (API) 416 associated therewith. Device driver interface 414 is configured to support and/or establish the interface between video renderer 410 and graphics device driver 422.

As illustrated at apparatus/system 400 and for a described implementation, device driver interface 414 and graphics device driver 422 may further be categorized as being part of either a user mode 418 or a kernel mode 420 with respect to the associated operating system environment and graphics device 424. Hence, video renderer 410 and device driver interface 414 are part of user mode 418, and graphics device driver 422 is part of kernel mode 420. Those communications occurring at least between device driver interface 414 and graphics device driver 422 cross between user mode 418 and kernel mode 420.

In this described implementation, the video image data that is output by video renderer 410 is thus provided to graphics processor unit 426. Graphics processor unit 426 is configurable to perform one or more image processing operations. These image processing operations include ProcAmp adjustments and/or other video processing operations as indicated by ProcAmp adjustment logic 428 and/or other video processing operations logic 430, respectively. ProcAmp adjustment operations and other exemplary video processing operations, such as de-interlacing and frame rate conversion, are described further below as well as above.

The output from graphics processor unit 426 is provided to video memory 432. When video memory 432 is read from, the resulting image data can be forwarded to a digital-to-analog converter 434, which outputs a corresponding analog video signal that is suitable for display on and by display device 436. In other configurations, display device 436 may be capable of displaying the digital image data from video memory 432 without analog conversion by a digital-to-analog converter 434.

Exemplary Protocol between a Video Renderer and a Graphics Device Driver

Figure 5:
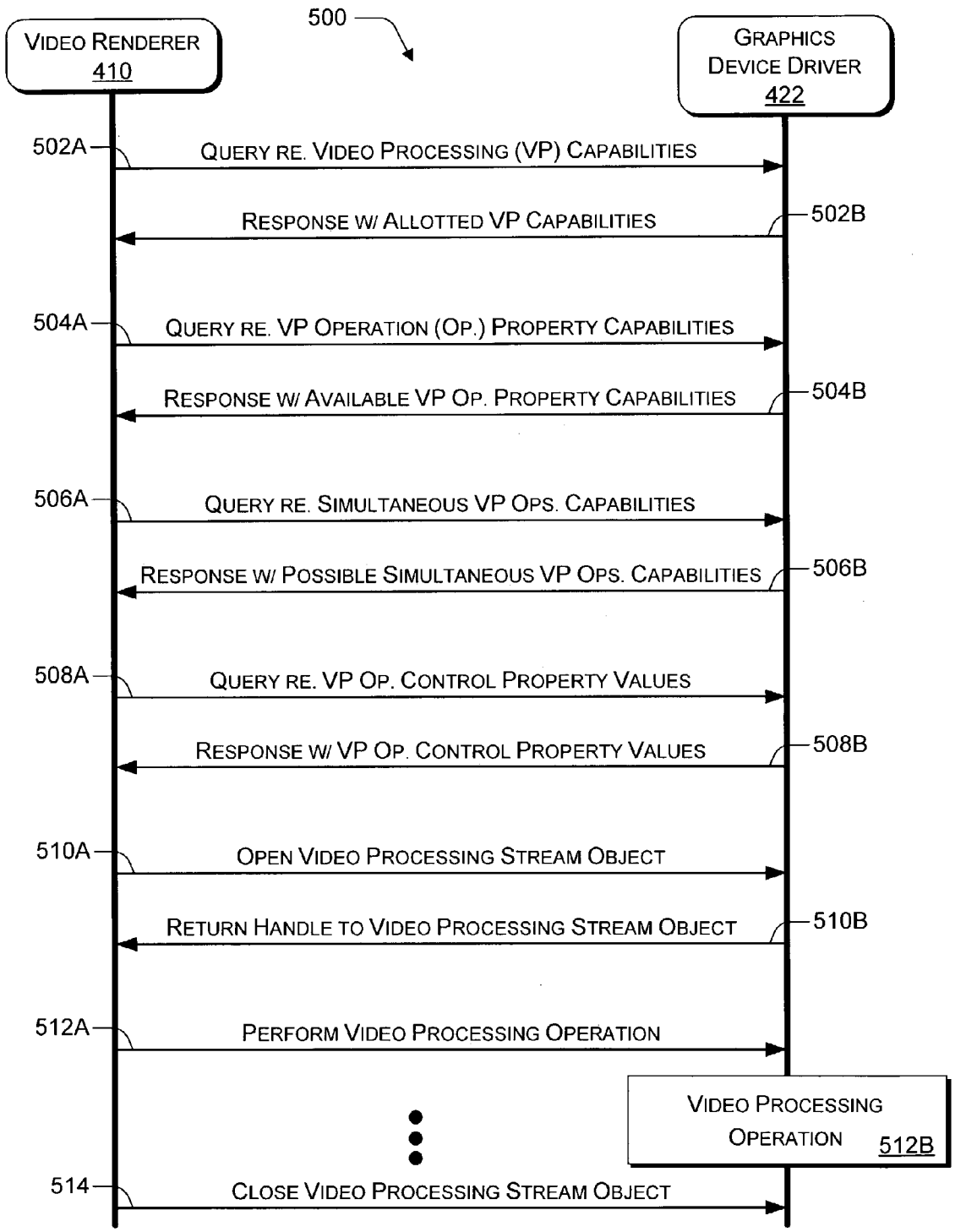
FIG. 5 is a communications/signaling diagram that illustrates an exemplary protocol between a video renderer and a graphics device driver.

FIG. 5 is a communications/signaling diagram 500 that illustrates an exemplary protocol between a video renderer 410 and a graphics device driver 422. The exemplary protocol facilitates the performance of video (or other image) processing operations such as a ProcAmp adjustment. Such video processing operations may include those that are requested/specified by a user activated and controlled video display application (e.g., an instigating application).

Communications/signaling diagram 500 includes multiple communication exchanges and communication transmissions between video renderer 410 and graphics device driver 422. Optionally, the communications may be enabled and/or aided by graphic interface 412 (of FIG. 4) and/or device driver interface 414, along with any applicable APIs 416 thereof.

A communications exchange 502 is directed to establishing video processing (VP) capabilities. Specifically, video renderer 410 requests or queries at transmission 502A graphics device driver 422 regarding video processing capabilities that are possessed by and that are to be provided by graphics device driver 422. In response 502B, graphics device driver 422 informs video renderer 410 of the allotted video processing capabilities.

The allotted video processing capabilities include those video processing operations that graphics device driver 422 is capable of performing. These may include one or more of ProcAmp control adjustment operations, de-interlacing operations, aspect ratio correction operations, color space conversion operations, vertical/horizontal mirroring and alpha blending, frame rate conversion operations, and so forth. Graphics device driver 422 may choose to provide all or a portion of the remaining video processing operational bandwidth. By allotting less than all of the remaining video processing operations bandwidth, graphics device driver 422 is able to hold in reserve additional video processing operations bandwidth for subsequent requests.

A communications exchange 504 is directed to establishing control property capabilities for a specified video processing operation. In a request 504A that is sent from video renderer 410 to graphics device driver 422, video renderer 410 specifies a particular video processing operation allotted in response 502B. Request 504A may also include an inquiry as to what or which property capabilities graphics device driver 422 is able to perform with respect to the particular video processing operation. In a response 504B, graphics device driver 422 informs video renderer 410 as to the property capabilities that are available for the specified particular video processing operation. Communications exchange 504 may be omitted if, for example, there are not multiple control property capabilities for the particular video processing operation.

A communications exchange 506 is directed to establishing which of the other allotted video processing operations may be performed simultaneously with the particular video processing operation as specified. In a request 506A, video renderer 410 issues a query to graphics device driver 422 to determine which video processing operations, if any, may be performed simultaneously with the particular video processing operation. Graphics device driver 422 informs video renderer 410 in response 506B of the video processing operations that is possible for graphics device driver 422 to perform simultaneously with the particular video processing operation. By way of example, it should be noted that (i) transmissions 504A and 506A and/or (ii) transmissions 504B and 506B may be combined into single query and response transmissions, respectively.

A communications exchange 508 is directed to establishing values for a specified control property of the particular video processing operation. In a request 508A, video renderer 410 specifies in an inquiry a control property for the particular video processing operation. The specified control property may be selected from the available control properties provided in response 504B. Graphics device driver 422 provides values that are related to the specified control property for the particular video processing operation to video renderer 410. These values may be numerical set points, ranges, etc. that video renderer 410 can utilize as a framework when instructing graphics device driver 422 to perform the particular video processing operation. Communications exchange 508 may be repeated for each available control property that is indicated in response 504B. Alternatively, one such communication exchange 508 may be directed to multiple (including all of the) control properties of the available control properties.

A communications exchange 510 is directed to initiating a video processing stream object. In an instruction 510A, video renderer 410 sends a command to graphics device driver 422 to open a video processing stream object. This command may be transmitted on behalf of an application or other software component that is trying to present video images on display device 436. In a response 510B, graphics device driver 422 returns a handle for the video processing stream object to the requesting video renderer 410.

In a transmission 512A, video renderer 410 instructs graphics device driver 422 to perform the particular or another allotted video processing operation. The perform video processing operation command may include selected numerals to set and/or change values for one or more control properties for the particular video processing operation. In response, graphics device driver 422 performs a video processing operation 512B as requested in transmission 512A. Typically, at least one video renderer 410 is assigned to each application that is to be displaying video. Whenever such an instigating application requests a video processing operation, for example, video renderer 410 forwards such request as a video processing operation instruction, optionally after reformatting, translation, and so forth, to graphics device driver 422.

Perform video processing operation commands 512A and resulting video processing operations 512B may be repeated as desired while the video processing stream object is extant. When the video is completed or the relevant software is terminated, a close video processing stream object instruction 514 is transmitted from video renderer 410 to graphics device driver 422.

Figure 6:
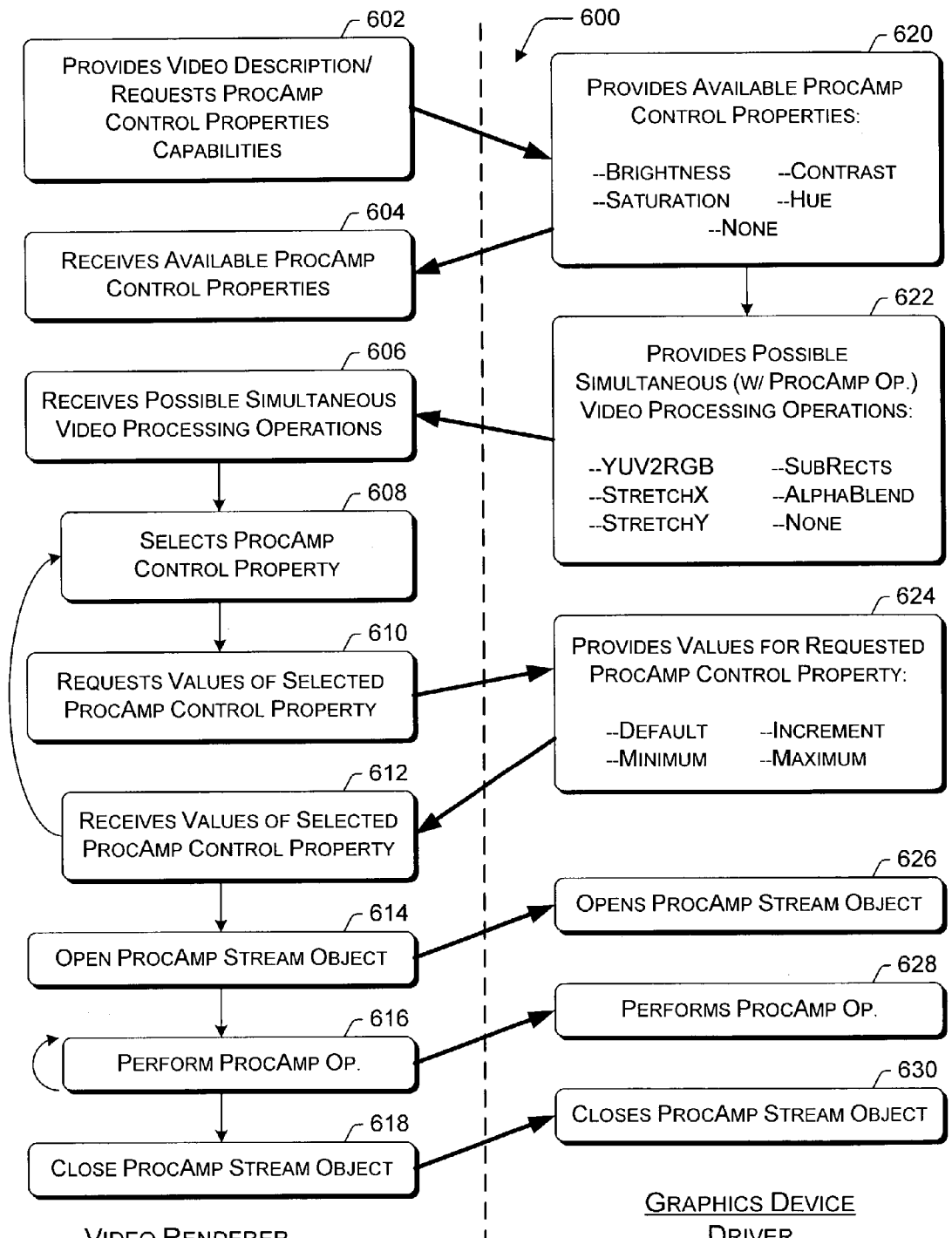
FIG. 6 is a flow diagram that illustrates an exemplary method for facilitating interaction between a video renderer and a graphics device driver.

The approaches of FIGS. 4, 5, and 6, for example, are illustrated in diagrams that are divided into multiple blocks and/or multiple transmissions. However, the order and/or layout in which the approaches are described and/or shown is not intended to be construed as a limitation, and any number of the blocks/transmissions can be combined and/or re-arranged in any order to implement one or more systems, methods, media, protocols, arrangements, etc. for facilitating interaction between video renderers and graphics device drivers. Furthermore, although the description herein includes references to specific implementations such as that of FIG. 4 (as well as the exemplary system environment of FIG. 7) and to exemplary APIs, the approaches can be implemented in any suitable hardware, software, firmware, or combination thereof and using any suitable programming language(s), coding mechanism(s), protocol paradigm(s), graphics setup(s), and so forth.

Exemplary General API Implementation

FIG. 6 is a flow diagram 600 that illustrates an exemplary method for facilitating interaction between a video renderer 410 and a graphics device driver 422. Although a described implementation as reflected by FIG. 6 is directed to a ProcAmp adjustment operation, it is not so limited. Instead, at least certain aspects of this exemplary general API implementation may be used with one or more other video (or general image) processing operations.

In flow diagram 600, video renderer 410 is associated with nine (9) blocks 602-618, and graphics device driver 422 is associated with six (6) blocks 620-630. Each of blocks 602-618 and 620-630 corresponds to at least one action that is performed by or on behalf of video renderer 410 and graphics device driver 422, respectively.

Flow diagram 600 is described below in the context of exemplary general APIs. These general APIs as described herein can be divided into two functional groups of methods, apparatus logic, etc. The first group can be used to determine the video processing capabilities of a graphics device. The second group can be used to create and use video processing operation stream objects.

These exemplary general APIs may correspond to APIs 416 (of FIG. 4) that are illustrated as being part of device driver interface 414, which supports graphic interface 412 and interfaces with graphics device driver 422. APIs 416 are thus illustrated as being part of device driver interface 414 that is in user mode portion 418. However, such APIs 416 may alternatively be located at and/or functioning with other logic besides device driver interface 414. Such other logic includes, by way of example only, video renderer 410, graphic interface 412, some part of kernel mode portion 420, and so forth.

The general APIs described below in this section may be used to extend/enhance/etc. Microsoft® DirectX® Video Acceleration (VA), for example, so as to support any of a number of video processing operations (e.g., ProcAmp adjustments, frame rate conversions, etc.) for video content being displayed in conjunction with a graphics device driver. Additional related information can be found in a Microsoft® Windows® Platform Design Note entitled "DirectX® VA:

Video Acceleration API/DDI", dated Jan. 23, 2001. "DirectX® VA: Video Acceleration API/DDI" is hereby incorporated by reference in its entirety herein.

Although the actions of flow diagram 600 are described herein in terms of APIs that are particularly applicable to the current evolution of Microsoft® Windows® operating systems for personal computers, it should be understood that the blocks thereof, as well as the other implementations described herein, are also applicable to other operating systems and/or other electronic devices.

In the following examples, the output of the video processing operation(s) is provided in an RGB render target format such as a target DirectDraw® surface. Doing so precludes the need for conventional hardware overlay techniques. Additionally, an entire screen as viewable on a display device, including any video images, exists and, furthermore, is present in one memory location so that it can be captured by a print screen command. This print screen capture can then be pasted into a document, added to a file, printed directly, and so forth.

In flow diagram 600, video renderer 410 may have already been informed by graphics device driver 422 that associated graphics hardware is capable of performing ProcAmp adjustment video processing operations or video renderer 410 may determine the existence of ProcAmp capabilities, or the lack thereof, as follows. At block 602, video renderer 410 provides a description of the video to be displayed and requests graphics processing capabilities with respect to ProcAmp control properties.

Video renderer 410 makes the video description provision and/or the control properties request to graphics device driver 422 via one or more transmissions as indicated by the transmission arrow between block 602 and block 620. The description of the video enables graphics device driver 422 to tailor the available/possible/etc. video processing capabilities based on the type of video. For example, a predetermined set of capabilities may be set up for each of several different types of video.

At block 620, graphics device driver 422 provides video renderer 410 a listing of the available ProcAmp control properties. This list may include none or one or more of brightness, contrast, hue, and saturation. At block 604, video renderer 410 receives the available ProcAmp control properties from graphics device driver 422. Actions of blocks 620 and 622 may be performed responsive to the communication(s) of block 602. Alternatively, video renderer 410 may make a separate inquiry to elicit the actions of block 622.

At block 622, graphics device driver 422 provides video renderer 410 with those video processing operations that may possibly be performed simultaneously/concurrently with ProcAmp adjustment operations. Such video processing operations may include none or one or more of YUV2RGB, StretchX, StretchY, SubRects, and AlphaBlend. Other such video processing operations may include de-interlacing, frame rate conversion, and so forth. At block 606, video renderer 410 receives the possible simultaneous video processing operations from graphics device driver 422.

An exemplary general API for implementing at least part of the actions of blocks 602, 604, 606, 620, and 622 is provided as follows:

ProcAmpControlQueryCaps

This API enables video renderer 410 to query graphics device driver 422 to determine the information related to the input requirements of a ProcAmp control device and any additional video processing operations that might be supported at the same time as ProcAmp adjustment operations are being performed.

```
HRESULT
ProcAmpControlQueryCaps(
    [in] DXVA_VideoDesc* lpVideoDescription,
    [out] DXVA_ProcAmpControlCaps* lpProcAmpCaps
);
```

Graphics device driver 422 reports its capabilities for that mode in an output DXVA_ProcAmpControlCaps structure for lpProcAmpCaps.

```
typedef struct_DXVA_ProcAmpControlCaps {
    DWORD Size;
    DWORD InputPool;
    D3DFORMAT OutputFrameFormat;
    DWORD ProcAmpControlProps;
    DWORD VideoProcessingCaps;
} DXVA_ProcAmpControlCaps;
```

The Size field indicates the size of the data structure and may be used, inter alia, as a version indicator if different versions have different data structure sizes.

The InputPool field indicates a memory pool from which the video source surfaces are to be allocated. For example, the memory pool may be located at local video memory on the graphics card, at specially-tagged system memory (e.g., accelerated graphics port (AGP) memory), general system memory, and so forth. The D3D and DirectDraw documentations also provide a description of valid memory pool locations.

The OutputFrameFormat field indicates a Direct3D surface format of the output frames. The ProcAmp device can output frames in a surface format that matches the input surface format. This field ensures that video renderer 410 will be able to supply the correct format for the output frame surfaces to the ProcAmp control hardware. Note that if the DXVA_VideoProcess_YUV2RGB flag (see below) is returned in the VideoProcessingCaps field, video renderer 410 can assume that valid output formats are specified by this field as well as an RGB format such as RGB32. RGB32 is an RGB format with 8 bits of precision for each of the Red, Green, and Blue channels and 8 bits of unused data.

The ProcAmpControlProp field identifies the ProcAmp operations that the hardware is able to perform. Graphics device driver 422 returns the logical of the combination of the ProcAmp operations that it supports:

DXVA_ProcAmp_None. The hardware does not support any ProcAmp control operations.

DXVA_ProcAmp_Brightness. The ProcAmp control hardware can perform brightness adjustments to the video image.

DXVA_ProcAmp_Contrast. The ProcAmp control hardware can perform contrast adjustments to the video image.

DXVA_ProcAmp_Hue. The ProcAmp control hardware can perform hue adjustments to the video image.

DXVA_ProcAmp Saturation. The ProcAmp control hardware can perform saturation adjustments to the video image.

The VideoProcessingCaps field identifies other operations that can be performed concurrently with a requested ProcAmp adjustment. The following flags identify the possible operations:

- DXVA_VideoProcess_YUV2RGB. The ProcAmp control hardware can convert the video from the YUV color space to the RGB color space. The RGB format used can have 8 bits or more of precision for each color component. If this is possible, a buffer copy within video renderer 410 can be avoided. Note that there is no requirement with respect to this flag to convert from the RGB color space to the YUV color space.
- DXVA_VideoProces_StretchX. If the ProcAmp control hardware is able to stretch or shrink horizontally, aspect ratio correction can be performed at the same time as the video is being ProcAmp adjusted.
- DXVA_VideoProcess_StretchY Sometimes aspect ratio adjustment is combined with a general picture re-sizing operation to scale the video image within an application-defined composition space. This is a somewhat rare feature. Performing the scaling for resizing the video to fit into the application window can be done at the same time as the scaling for the ProcAmp adjustment. Performing these scalings together avoids cumulative artifacts.
- DXVA_VideoProcess_SubRects. This flag indicates that hardware is able to operate on a rectangular (sub-)region of the image as well as the entire image. The rectangular region can be identified by a source rectangle in a DXVA_ProcAmpControlBlt data structure.
- DXVA_VideoProcess_AlphaBlend. Alpha blending can control how other graphics information is displayed, such as by setting levels of transparency and/or opacity. Thus, an alpha value can indicate the transparency of a color—or the extent to which the color is blended with any background color. Such alpha values can range from a fully transparent color to a fully opaque color.

In operation, alpha blending can be accomplished using a pixel-by-pixel blending of source and background color data. Each of the three color components (red, green, and blue) of a given source color may be blended with the corresponding component of the background color to execute an alpha blending operation. In an exemplary implementation, color may be generally represented by a 32-bit value with 8 bits each for alpha, red, green, and blue.

Again, using this feature can avoid a buffer copy with video renderer 410. However, this is also a rarely used feature because applications seldom alter the constant alpha value associated with their video stream.

At block 608 of flow diagram 600, video renderer 410 selects a ProcAmp control property from those received at block 604. At block 610, video renderer 410 requests one or more values for the selected ProcAmp control property from graphics device driver 422. At block 624, graphics device driver 422 sends to video renderer 410 values for the requested ProcAmp control property. Such values may relate to one or more of a default value, an increment value, a minimum value, a maximum value, and so forth.

At block 612, video renderer 410 receives from graphics device driver 422, and is thus informed of, one or more values for the selected ProcAmp control property. As indicated by the flow arrow from block 612 to block 608, the actions of blocks 608, 610, 612, and 624 may be repeated for more than one including all of the available ProcAmp control properties. Alternatively, video renderer 410 may query graphics device driver 422 for more than one including all of the available ProcAmp control properties in a single communication exchange having two or more transmissions.

An exemplary general API for implementing at least part of the actions of blocks 608, 610, 612, and 624 is provided as follows:

ProcAmpControlQueryRange

For each ProcAmp property (brightness, contrast, saturation, hue, etc.), video renderer 410 queries graphics device driver 422 to determine the minimum, maximum, step size (increment), default value, and so forth. If the hardware does not support a particular ProcAmp control property, graphics device driver 422 may return "E_NOTIMPL" in response to the ProcAmpControlQueryRange function.

Although graphics device driver 422 can return any values it wishes for the different ProcAmp control properties, the following settings values are provided by way of example (all tabulated values are floats):

| Property | Minimum | Maximum | Default | Increment |
| --- | --- | --- | --- | --- |
| Brightness | −100.0 F | 100.0 F | 0.0 F | 0.1 F |
| Contrast | 0.0 F | 10.0 F | 1.0 F | 0.01 F |
| Saturation | 0.0 F | 10.0 F | 1.0 F | 0.01 F |
| Hue | −180.0 F | 180.0 F | 0.0 F | 0.1 F |

If the default values result in a null transform of the video stream, video renderer 410 is allowed to bypass the ProcAmp adjustment stage in its video pipeline if the instigating application does not alter any of the ProcAmp control properties.

```
HRESULT
ProcAmpControlQueryRange(
    [in] DWORD VideoProperty,
    [in] DXVA_VideoDesc* lpVideoDescription,
    [out] DXVA_VideoPropertyRange* lpPropRange
);
```

VideoProperty identifies the ProcAmp control property (or properties) that graphics device driver 422 has been requested to return information for. In a described implementation, possible parameter values for this field are:
- DXVA_ProcAmp_Brightness;
- DXVA_ProcAmp_Contrast;
- DXVA_ProcAmp_Hue; and
- DXVA_ProcAmp_Saturation.

lpVideoDescription provides graphics device driver 422 with a description of the video that the ProcAmp adjustment is going to be applied to. Graphics device driver 422 may adjust its ProcAmp feature support for particular video stream description types.

lpPropRange identifies the range (min and max), step size, and default value, for the ProcAmp control property that is specified by the VideoProperty parameter/field.

```
typedef struct _DXVA_VideoPropertyRange {
    FLOAT MinValue;
    FLOAT MaxValue;
    FLOAT DefaultValue;
    FLOAT StepSize;
} DXVA_VideoPropertyRange, *LPDXVA_VideoPropertyRange;
```

At block 614 of flow diagram 600, video renderer 410 sends an open ProcAmp stream object command to graphics device driver 422. In response, graphics device driver 422 opens a ProcAmp stream object at block 626. At block 616, video renderer 410 instructs graphics device driver 422 to perform a ProcAmp adjustment operation. In response, graphics device driver 422 performs the requested ProcAmp adjustment operation at block 628.

As indicated by the curved flow arrow at block 616, video renderer 410 may continue to send perform ProcAmp adjustment operation instructions to graphics device driver 422 as long as desired (e.g., whenever required by an instigating application displaying the video stream). At block 618, video renderer 410 instructs graphics device driver 422 to close the ProcAmp stream object. Graphics device driver 422 then closes the ProcAmp stream object at block 630.

An exemplary general API for implementing at least part of the actions of blocks 614, 616, 618, 626, 628, and 630 is provided as follows:

The ProcAmpStream Object

After video renderer 410 has determined the capabilities of the ProcAmp control hardware, a ProcAmpStream object can be created. Creation of a ProcAmpStream object allows graphics device driver 422 to reserve any hardware resources that are required to perform requested ProcAmp adjustment operation(s).

ProcAmpOpenStream

The ProcAmpOpenStream method creates a ProcAmpStream object.

```
HRESULT
ProcAmpOpenStream(
    [in] LPDXVA_VideoDesc lpVideoDescription,
    [out] HDXVA_ProcAmpStream* lphCcStrm
);
```

The HDXVA_ProcAmpStream output parameter is a handle to the ProcAmpStream object and is used to identify this stream in future calls that are directed thereto.

ProcAmpBlt

The ProcAmpBlt method performs the ProcAmp adjustment operation by writing the output to the destination surface during a bit block transfer operation.

```
HRESULT
ProcAmpBlt(
    [in] HDXVA_ProcAmpStream hCcStrm
    [in] LPDDSURFACE lpDDSDstSurface,
    [in] LPDDSURFACE lpDDSSrcSurface,
    [in] DXVA_ProcAmpBlt* ccBlt
);
```

The source and destination rectangles are used for either sub-rectangle ProcAmp adjustment or stretching. Support for stretching is optional (and is reported by Caps flags). Likewise, support for sub-rectangles is not mandatory.

The destination surface can be an off-screen plain, a D3D render target, a D3D texture, a D3D texture that is also a render target, and so forth. The destination surface may be allocated in local video memory, for example. The pixel format of the destination surface is the one indicated in the DXVA_ProcAmpCaps structure unless a YUV-to-RGB color space conversion is being performed along with the ProcAmp adjustment operation. In these cases, the destination surface format is an RGB format with 8 bits or more of precision for each color component.

ProcAmpCloseStream

The ProcAmpCloseStream method closes the ProcAmpStream object and instructs graphics device driver 422 to release any hardware resource associated with the identified stream.

```
HRESULT
ProcAmpCloseStream(
    HDXVA_ProcAmpStream hCcStrm
);
```

Exemplary Specific API Implementation

The particular situation and exemplary APIs described below in this section are specifically applicable to a subset of existing Microsoft® Windows® operating systems for personal computers. However, it should nevertheless be understood that the principles, as well as certain aspects of the pseudo code, that are presented below may be utilized (as is or with routine modifications) in conjunction with other operating systems and/or other environments.

DDI Mapping for a ProcAmp Interface

For compatibility with the DDI infrastructure for a subset of existing Microsoft® Windows® operating systems, the API described above in the previous section can be "mapped" to the existing DDI for DirectDraw and DirectX VA. This section describes a ProcAmp interface mapping to the existing DirectDraw and DX-VA DDI.

The DX-VA DDI is itself split into two functional groups: the "DX-VA container" and the "DX-VA device." The purpose of the DX-VA container DDI group is to determine the number and capabilities of the various DX-VA devices contained by the display hardware. Therefore, a DX-VA driver can only have a single container, but it can support multiple DX-VA devices.

It is not feasible to map the ProcAmpQueryCaps call on to any of the DDI entry points in the DX-VA container group because, unlike the rest of DX-VA, the container methods use typed parameters. However, the DX-VA device DDI group does not use typed parameters, so it is feasible to map the ProcAmp control interface to the methods in the device group. This section describes a specific example of how the ProcAmp interface can be mapped to the DX-VA device DDI.

De-interlace Container Device

The DX-VA device methods do not use typed parameters, so these methods can be reused for many different purposes. However, the DX-VA device methods can only be used in the context of a DX-VA device, so a first task is to define and create a special "container device."

U.S. Pat. No. 7,219,352, issued on May 15, 2007, which is titled "Methods And Apparatuses For Facilitating Processing Of Interlaced Video Images For Progressive Video Displays" and which is incorporated by reference herein above, includes description of a de-interlace container device. That Patent's described de-interlace container device is re-used here for the ProcAmpQueryCaps function.

The DX-VA de-interlace container device is a software construct only, so it does not represent any functional hardware contained on a physical device. The ProcAmp control sample (device) driver pseudo code presented below indicates how the container device can be implemented by a driver.

Calling the DDI from a User-Mode Component

An exemplary sequence of eight (8) tasks to use the DDI from a user-mode component such as a (video) renderer is as follows:

1. Call GetMoCompGuids to get the list of DX-VA devices supported by the driver.

2. If the "de-interlace container device" GUID is present, call CreateMoComp to create an instance of this DX-VA device. The container device GUID is defined as follows:
DEFINE_GUID(DXVA_DeinterlaceContainerDevice, 0x0e85cb93,0x3046,0x4ff0,0xae,0xcc,0xd5,0x8c,0xb5, 0xf0, 0x35,0xfc);

3. Call RenderMocomp with a dwFunction parameter that identifies a ProcAmpControlQueryModeCaps operation. Again, the lpInputData parameter is used to pass the input parameters to the driver, which returns its output through the lpOutputData parameter.

4. For each ProcAmp adjustment property supported by the hardware the renderer calls RenderMocomp with a dwFunction parameter that identifies a ProcAmpControlQueryRange operation. The lpInputData parameter is used to pass the input parameters to the driver, which returns its output through the lpOutputData parameter.

5. After the renderer has determined the ProcAmp adjustment capabilities of the hardware, it calls CreateMocomp to create an instance of the ProcAmp control device. The ProcAmp control device GUID is defined as follows:
DEFINE_GUID(DXVA_ProcAmpControlDevice, 0x9f2009 13,0x2ffd, 0x4056,0x9f,0x1e,0xe1,0xb5,0x08, 0xf2,0x2d,0xcf);

6. The renderer then calls the ProcAmp control device's RenderMocomp with a function parameter of DXVA_ProcAmpControlBltFnCode for each ProcAmp adjusting operation.

7. When the renderer no longer needs to perform any more ProcAmp operations, it calls DestroyMocomp.

8. The driver releases any resources used by the ProcAmp control device.

ProcAmpControlQueryCaps

This method maps directly to a call to the RenderMoComp method of the de-interlace container device. The DD_RENDERMOCOMPDATA structure is completed as follows:
dwNumBuffers is zero.
lpBufferInfo is NULL.
dwFunction is defined as
DXVA_ProcAmpControlQueryCapsFnCode.
lpInputData points to a DXVA_VideoDesc structure.
lpOutputData points to a DXVA_ProcAmpCaps structure.
Note that the DX-VA container device's RenderMoComp method can be called without BeginMoCompFrame or EndMoCompFrame being called first.

ProcAmpControlQueryRange

This method maps directly to a call to the RenderMoComp method of the de-interlace container device. The DD_RENDERMOCOMPDATA structure is completed as follows:
dwNumBuffers is zero.
lpBufferInfo is NULL.
dwFunction is defined as
DXVA_ProcAmpControlQueryRangeFnCode.
lpInputData points to a
DXVA_ProcAmpControlQueryRange structure.

```
typedef struct_DXVA_ProcAmpQueryRange {
    DWORD         Size;
    DWORD         VideoProperty;
    DXVA_VideoDesc VideoDesc;
} DXVA_ProcAmpControlQueryRange,
 *LPDXVA_ProcAmpControlQueryRange;
``` lpOutputData will point to a DXVA_VideoPropertyRange structure.
Note that the DX-VA container device's RenderMoComp method can be called without BeginMoCompFrame or EndMoCompFrame being called first.

ProcAmpControlOpenStream

This method maps directly to a CreateMoComp method of the DD_MOTIONCOMPCALLBACKS structure, where the GUID is the ProcAmp Device GUID, pUncompData points to a structure that contains no data (all zeros), and pData points to a DXVA_VideoDesc structure.

If a driver supports accelerated decoding of compressed video, the renderer can call the driver to create two DX-VA devices—one to perform the actual video decoding work as defined by the DirectX VA Video Decoding specification and another to be used strictly for ProcAmp adjustments.

Example: Mapping CreateMoComp to ProcAmpControlOpenStream

The exemplary pseudo code below shows how a driver can map the CreateMoComp DDI call into calls to ProcAmpControlOpenStream. The pseudo code shows how the CreateMocComp function is used for ProcAmp. If a driver supports other DX-VA functions such as decoding MPEG-2 video streams, the sample code below can be extended to include processing of additional DX-VA GUIDs.

```
DWORD APIENTRY
CreateMoComp(
    LPDDHAL_CREATEMOCOMPDATA lpData
    )
{
    // Make sure its a guid we like.
    if (!ValidDXVAGuid(lpData->lpGuid)) {
        DbgLog((LOG_ERROR, 1,
            TEXT("No formats supported for this GUID")));
        lpData->ddRVal = E_INVALIDARG;
        return DDHAL_DRIVER_HANDLED;
    }
    // Look for the deinterlace container device GUID
    if (*lpData->lpGuid == DXVA_DeinterlaceContainerDevice) {
        DXVA_DeinterlaceContainerDeviceClass* lpDev =
            new DXVA_DeinterlaceContainerDeviceClass(
                *lpData->lpGuid,
                DXVA_DeviceContainer);
        if (lpDev) {
```

-continued

```
        lpData->ddRVal = DD_OK;
    }
    else {
        lpData->ddRVal = E_OUTOFMEMORY;
    }
    lpData->lpMoComp->lpDriverReserved1 =
        (LPVOID)(DXVA_DeviceBaseClass*)lpDev;
    return DDHAL_DRIVER_HANDLED;
}
// Look for the ProcAmp Control device GUID
if (*lpData->lpGuid == DXVA_ProcAmpControlDevice) {
    DXVA_ProcAmpControlDeviceClass* lpDev =
        new DXVA_ProcAmpControlDeviceClass(
            *lpData->lpGuid,
            DXVA_DeviceProcAmpControl);
    if (lpDev) {
        LPDXVA_VideoDesc lpVideoDescription =
            (LPDXVA_VideoDesc)lpData->lpData;
        lpData->ddRVal =
            lpDev->ProcAmpControlOpenStream(
                lpVideoDescription);
        if (lpData->ddRVal != DD_OK) {
            delete lpDev;
            lpDev = NULL;
        }
    }
    else {
        lpData->ddRVal = E_OUTOFMEMORY;
    }
    lpData->lpMoComp->lpDriverReserved1 =
        (LPVOID)(DXVA_DeviceBaseClass*)lpDev;
    return DDHAL_DRIVER_HANDLED;
}
lpData->ddRVal = DDERR_CURRENTLYNOTAVAIL;
return DDHAL_DRIVER_HANDLED;
}
```

Example: Implementing GetMoCompGuids

In addition to the CreateMoComp DDI function, a driver can also be capable of implementing the GetMoCompGuids method of the DD_MOTIONCOMPCALLBACKS structure. The following exemplary pseudo code shows one manner of implementing this function in a driver.

```
// This is a list of DV-VA device GUIDs supported by
// the driver - this list includes decoder, ProcAmp and
// the de-interlacing container device. There is no significance to
// the order of the GUIDs on the list.
DWORD g_dwDXVANumSupportedGUIDs = 2;
const GUID* g_DXVASupportedGUIDs[2] = {
    &DXVA_DeinterlaceContainerDevice,
    &DXVA_ProcAmpControlDevice
};
DWORD APIENTRY
GetMoCompGuids(
    PDD_GETMOCOMPGUIDSDATA lpData
)
{
    DWORD dwNumToCopy;
    // Check to see if this is a GUID request or a count request
    if (lpData->lpGuids) {
        dwNumToCopy =
            min(g_dwDXVANumSupportedGUIDs,
                lpData->dwNumGuids);
        for (DWORD i = 0; i < dwNumToCopy; i++) {
            lpData->lpGuids[i] =
                *g_DXVASupportedGUIDs[i];
        }
    }
    else {
        dwNumToCopy = g_dwDXVANumSupportedGUIDs;
    }
    lpData->dwNumGuids = dwNumToCopy;
```

-continued

```
    lpData->ddRVal = DD_OK;
    return DDHAL_DRIVER_HANDLED;
}
```

ProcAmpControlBlt

This method maps directly to a RenderMoComp method of the DD_MOTIONCOMPCALLBACKS structure, where:
 dwNumBuffers is two.
 lpBufferInfo points to an array of two surfaces. The first element of the array is the destination surface; the second element of the array is the source surface.
 dwFunction is defined as
 DXVA_ProcAmpControlBltFnCode.
 lpInputData points to the following structure:

```
typedef struct_DXVA_ProcAmpControlBlt {
    DWORD   Size;
    RECT    DstRect;
    RECT    SrcRect;
    FLOAT   Alpha;
    FLOAT   Brightness;
    FLOAT   Contrast;
    FLOAT   Hue;
    FLOAT   Saturation;
} DXVA_ProcAmpControlBlt;
``` lpOutputData is NULL.

Note that for the DX-VA device used for ProcAmp, RenderMoComp can be called without calling BeginMoCompFrame or EndMoCompFrame.

Example: Mapping RenderMoComp to ProcAmpControlBlt

The exemplary pseudo code below shows how a driver can map the RenderMoComp DDI call into calls to ProcAmpBlt. The sample code shows how the RenderMoComp function is used for ProcAmp adjustment. If the driver supports other DX-VA functions such as decoding MPEG-2 video streams, the sample code below can be extended to include processing of additional DX-VA GUIDs.

```
DWORD APIENTRY
RenderMoComp(
    LPDDHAL_RENDERMOCOMPDATA lpData
)
{
    if (lpData->dwFunction == DXVA_ProcAmpControlBltFnCode)
    {
        DXVA_ProcAmpControlDeviceClass* pDXVADev =
            (DXVA_ProcAmpControlDeviceClass*)pDXVABase;
        DXVA_ProcAmpControlBlt* lpBlt =
            (DXVA_ProcAmpControlBlt*)lpData->lpInputData;
        LPDDMCBUFFERINFO lpBuffInfo = lpData->lpBufferInfo;
        lpData->ddRVal = pDXVADev->ProcAmpControlBlt(
            lpBuffInfo[0].lpCompSurface,
            lpBuffInfo[1].lpCompSurface,
            lpBlt);
        return DDHAL_DRIVER_HANDLED;
    }
    lpData->ddRVal = E_INVALIDARG;
    return DDHAL_DRIVER_HANDLED;
}
```

ProcAmpControlCloseStream

This method maps directly to a DestroyMoComp method of the DD_MOTIONCOMPCALLBACKS structure.

Example: Mapping DestroyMoComp to ProcAmpControlCloseStream

The following exemplary pseudo code shows how a driver can map the DestroyMoComp DDI call into calls to ProcAmpControlCloseStream. The sample code shows how the DestroyMoComp function is used for ProcAmp control. If the driver supports other DX-VA functions such as decoding MPEG-2 video streams, the sample code below can be extended to include processing of additional DX-VA GUIDs.

```
DWORD APIENTRY
DestroyMoComp(
    LPDDHAL_DESTROYMOCOMPDATA lpData
    )
{
    DXVA_DeviceBaseClass* pDXVABase =
(DXVA_DeviceBaseClass*)
        lpData->lpMoComp->lpDriverReserved1;
    if (pDXVABase == NULL) {
        lpData->ddRVal = E_POINTER;
        return DDHAL_DRIVER_HANDLED;
    }
    switch (pDXVABase->m_DeviceType) {
    case DXVA_DeviceContainer:
        lpData->ddRVal = S_OK;
        delete pDXVABase;
        break;
    case DXVA_DeviceProcAmpControl:
        {
            DXVA_ProcAmpControlDeviceClass* pDXVADev =
                (DXVA_ProcAmpControlDeviceClass*)pDXVABase;
            lpData->ddRVal = pDXVADev-
>ProcAmpControlCloseStream( );
            delete pDXVADev;
        }
        break;
    }
    return DDHAL_DRIVER_HANDLED;
}
```

Exemplary Operating Environment for Computer or Other Electronic Device

Figure 7:
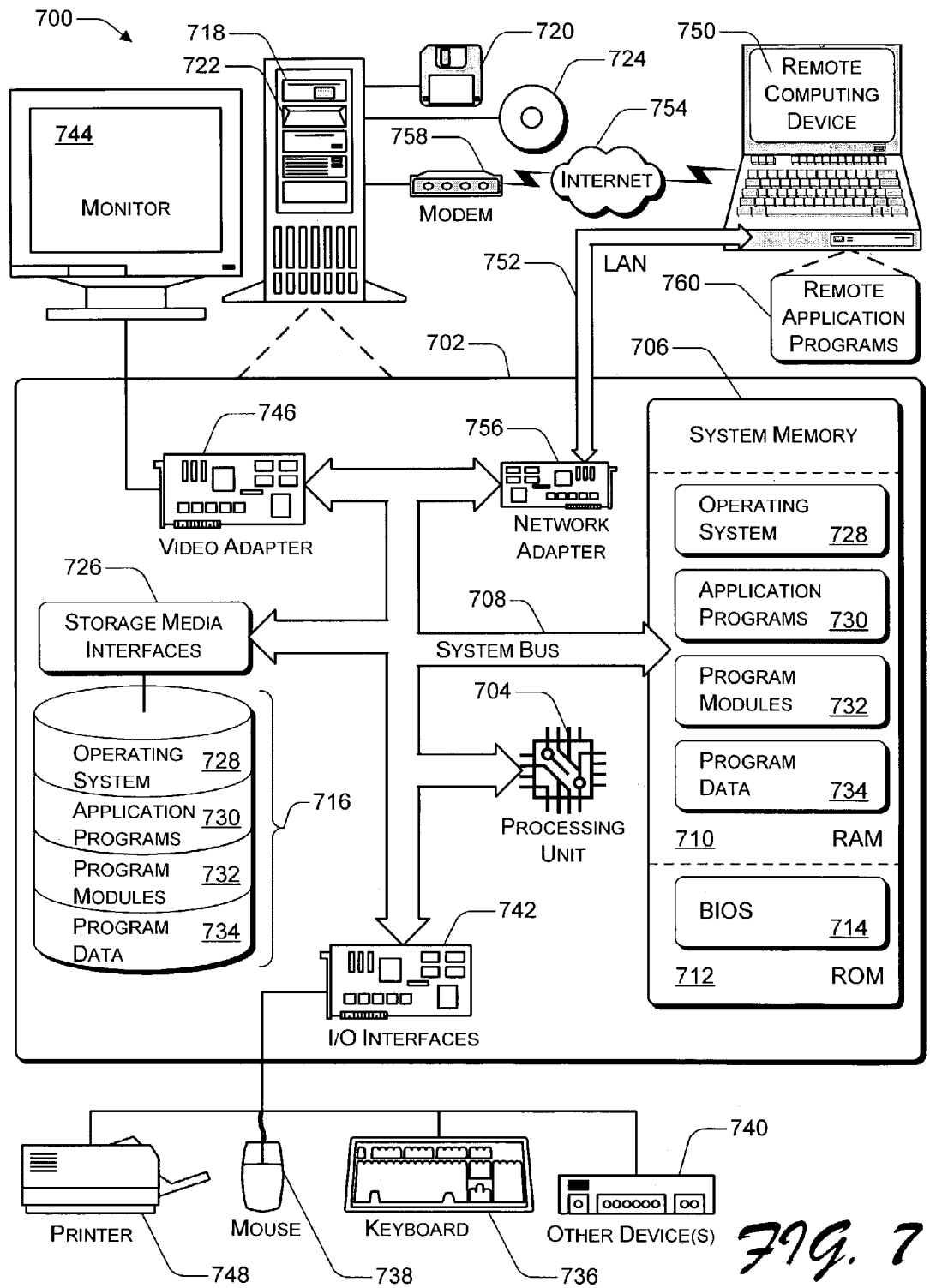
FIG. 7 illustrates an exemplary computing (or general electronic device) operating environment that is capable of (wholly or partially) implementing at least one aspect of facilitating interaction between video renderers and graphics device drivers as described herein.

FIG. 7 illustrates an exemplary computing (or general electronic device) operating environment 700 that is capable of (fully or partially) implementing at least one system, device, component, arrangement, protocol, approach, method, process, some combination thereof, etc. for facilitating interaction between video renderers and graphics device drivers as described herein. Computing environment 700 may be utilized in the computer and network architectures described below or in a stand-alone situation.

Exemplary electronic device operating environment 700 is only one example of an environment and is not intended to suggest any limitation as to the scope of use or functionality of the applicable electronic (including computer, game console, television, etc.) architectures. Neither should electronic device environment 700 be interpreted as having any dependency or requirement relating to any one or to any combination of components as illustrated in FIG. 7.

Additionally, facilitating interaction between video renderers and graphics device drivers may be implemented with numerous other general purpose or special purpose electronic device (including computing system) environments or configurations. Examples of well known electronic (device) systems, environments, and/or configurations that may be suitable for use include, but are not limited to, personal computers, server computers, thin clients, thick clients, personal digital assistants (PDAs) or mobile telephones, handheld or laptop devices, multiprocessor systems, microprocessor-based systems, set top boxes, programmable consumer electronics, video game machines, game consoles, portable or handheld gaming units, network PCs, minicomputers, mainframe computers, distributed computing environments that include any of the above systems or devices, some combination thereof, and so forth.

Implementations for facilitating interaction between video renderers and graphics device drivers may be described in the general context of electronically-executable instructions. Generally, electronically-executable instructions include routines, programs, objects, components, data structures, etc. that perform particular tasks or implement particular abstract data types. Facilitating interaction between video renderers and graphics device drivers, as described in certain implementations herein, may also be practiced in distributed computing environments where tasks are performed by remotely-linked processing devices that are connected through a communications link and/or network. Especially in a distributed computing environment, electronically-executable instructions may be located in separate storage media, executed by different processors, and/or propagated over transmission media.

Electronic device environment 700 includes a general-purpose computing device in the form of a computer 702, which may comprise any electronic device with computing and/or processing capabilities. The components of computer 702 may include, but are not limited to, one or more processors or processing units 704, a system memory 706, and a system bus 708 that couples various system components including processor 704 to system memory 706.

System bus 708 represents one or more of any of several types of wired or wireless bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of electronically-accessible media. Such media may be any available media that is accessible by computer 702 or another electronic device, and it includes both volatile and non-volatile media, removable and non-removable media, and storage and transmission media.

System memory 706 includes electronically-accessible storage media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD-ROM, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated electronically-accessible media provide non-volatile storage of electronically-executable instructions, such as data structures, program modules, and other data for computer 702. Although exemplary computer 702 illustrates a hard disk 716, a removable magnetic disk 720, and a removable optical disk 724, it is to be appreciated that other types of electronically-accessible media may store instructions that are accessible by an electronic device, such as magnetic cassettes or other magnetic storage devices, flash memory, CD-ROM, digital versatile disks (DVD) or other optical storage, RAM, ROM, electrically-erasable programmable read-only memories (EEPROM), and so forth. Such media may also include so-called special purpose or hard-wired integrated circuit (IC) chips. In other words, any electronically-accessible media may be utilized to realize the storage media of the exemplary electronic system and environment 700.

Any number of program modules (or other units or sets of instructions) may be stored on hard disk 716, magnetic disk 720, optical disk 724, ROM 712, and/or RAM 710, including by way of general example, an operating system 728, one or more application programs 730, other program modules 732, and program data 734. By way of specific example but not limitation, video renderer 410, graphic interface 412, and device driver interface 414 (all of FIG. 4) may be part of operating system 728. Graphics device driver 422 may be part of program modules 732, optionally with a close linkage and/or integral relationship with operating system 728. Also, an instigating program such as Windows® Media® 9 is an example of an application program 730. Image control and/or graphics data that is currently in system memory may be part of program data 734.

A user that is changing ProcAmp or other video settings, for example, may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, scanner, and/or the like. These and other input devices are connected to processing unit 704 via input/output interfaces 742 that are coupled to system bus 708. However, they and/or output devices may instead be connected by other interface and bus structures, such as a parallel port, a game port, a universal serial bus (USB) port, an IEEE 1394 ("Firewire") interface, an IEEE 802.11 wireless interface, a Bluetooth® wireless interface, and so forth.

A monitor/view screen 744 (which is an example of display device 436 of FIG. 4) or other type of display device may also be connected to system bus 708 via an interface, such as a video adapter 746. Video adapter 746 (or another component) may be or may include a graphics card (which is an example of graphics device 424) for processing graphics-intensive calculations and for handling demanding display requirements. Typically, a graphics card includes a GPU (such as GPU 426), video RAM (VRAM) (which is an example of video memory 432), etc. to facilitate the expeditious performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a personal computer, a portable computer (e.g., laptop computer, tablet computer, PDA, mobile station, etc.), a palm or pocket-sized computer, a gaming device, a server, a router, a network computer, a peer device, other common network node, or another computer type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, other wireless networks, gaming networks, some combination thereof, and so forth.

When implemented in a LAN networking environment, computer 702 is usually connected to LAN 752 via a network interface or adapter 756. When implemented in a WAN networking environment, computer 702 typically includes a modem 758 or other means for establishing communications over WAN 754. Modem 758, which may be internal or external to computer 702, may be connected to system bus 708 via input/output interfaces 742 or any other appropriate mechanism(s). It is to be appreciated that the illustrated network connections are exemplary and that other means of establishing communication link(s) between computers 702 and 750 may be employed.

In a networked environment, such as that illustrated with electronic device environment 700, program modules or other instructions that are depicted relative to computer 702, or portions thereof, may be fully or partially stored in a remote memory storage device. By way of example, remote application programs 760 reside on a memory component of remote computer 750 but may be usable or otherwise accessible via computer 702. Also, for purposes of illustration, application programs 730 and other electronically-executable instructions such as operating system 728 are illustrated herein as discrete blocks, but it is recognized that such programs, components, and other instructions reside at various times in different storage components of computing device 702 (and/or remote computing device 750) and are executed by data processor(s) 704 of computer 702 (and/or those of remote computing device 750).

Although systems, media, methods, protocols, approaches, processes, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A computer-implemented method for facilitating interaction between one or more video renderers and at least one graphics device driver, the method comprising:

querying, by a video renderer of the one or more video renderers, the at least one graphics device driver regarding process amplifier (ProcAmp) control property capabilities, the querying including a description of video to be displayed;

generating, based on the description of video to be displayed, a response including information relating to ProcAmp control property capabilities;

sending the response to the video renderer from the at least one graphics device driver, wherein the information relating to ProcAmp control property capabilities includes at least a subset of ProcAmp control property capabilities that the at least one graphics device driver can offer to the video renderer;

providing to the video renderer from the graphics device driver, ProcAmp adjustments that may be performed simultaneously with video processing operations associated with the subset of ProcAmp control properties;

selecting, at the video renderer, a ProcAmp control property associated with one of the subset of ProcAmp control property capabilities;

receiving at the graphics device driver, from the video renderer, a request for values associated with the selected ProcAmp control property;

providing values to the video renderer in response to the request for values associated with the selected ProcAmp control property, the values being used in video processing operations;

receiving at the graphics device driver from the video renderer, a command to open a ProcAmp stream object;

opening the ProcAmp stream object;

sending to the video renderer, from the graphics device driver, another response having a handle pointing to the opened ProcAmp stream object;

receiving at the graphics device driver, from the video renderer, a command to perform a ProcAmp adjustment; and causing performance of the ProcAmp adjustment, wherein;

the command includes an instruction to perform a video processing operation associated with the selected ProcAmp control property concurrently with the ProcAmp adjustment;

causing performance of the ProcAmp adjustment comprises causing a concurrent performance of the ProcAmp adjustment and the video processing operation; and the information relating to ProcAmp control property capabilities is directed to video processing operations that are performed simultaneously with the ProcAmp adjustments.

2. The method as recited in claim 1, wherein the at least a subset of ProcAmp capabilities that the at least one graphics device driver can offer to the video renderer comprises ProcAmp capabilities allotted to the video renderer from the at least one graphics device driver.

3. The method as recited in claim 1, wherein the graphics device driver has one or more predetermined sets of ProcAmp control property capabilities set up for one or more descriptions corresponding to the description of video to be displayed.

4. The method as recited in claim 1, wherein the method further comprises:

sending a command to close a video processing stream object to the graphics device driver from the video renderer;

receiving the command from the video renderer at the graphics device driver; and closing, by the graphics device driver, the video processing stream object.

5. One or more electronically-accessible media comprising electronically-executable instructions that, when executed, precipitate actions comprising:

receiving a query at a graphics device driver from a video renderer, the query comprising:

a request for information relating to process amplifier (ProcAmp) control property capabilities; and a description of the type of video to be displayed;

generating, based on the description of the video to be displayed, a response that includes the requested information that relates to ProcAmp control property capabilities;

sending the response to the video renderer from the graphics device driver;

providing to the video renderer from the graphics device driver, ProcAmp adjustments that may be performed simultaneously with video processing operations associated with the ProcAmp control properties;

selecting, at the video renderer, a ProcAmp control property associated with one of the ProcAmp control property capabilities;

receiving at the graphics device driver, from the video renderer, a request for values associated with the selected ProcAmp control property;

providing values to the video renderer in response to the request for values associated with the selected ProcAmp control property, the values being used in video processing operations;

receiving at the graphics device driver from the video renderer, a command to open a ProcAmp stream object;

opening the ProcAmp stream object;

sending to the video renderer, from the graphics device driver, another response having a handle pointing to the opened ProcAmp stream object;

receiving at the graphics device driver, from the video renderer, a command to perform a ProcAmp adjustment; and causing performance of the ProcAmp adjustment, wherein;

the command includes an instruction to perform a video processing operation associated with the selected ProcAmp control property concurrently with the ProcAmp adjustment;

causing performance of the ProcAmp adjustment comprises causing a concurrent performance of the ProcAmp adjustment and the video processing operation; and the information relating to ProcAmp control property capabilities is directed to video processing operations that are performed simultaneously with the ProcAmp adjustments.

6. The one or more electronically-accessible media as recited in claim 5, wherein one or more video processing operations performed concurrently with ProcAmp adjustments include at least one video processing operation selected from the group comprising: de-interlacing operations, aspect ratio corrections, color space conversions, frame rate conversions, vertical or horizontal mirroring operations, alpha blending operations, and none.

7. The one or more electronically-accessible media as recited in claim 5, wherein the command is directed to a bit block transfer.

8. The one or more electronically-accessible media as recited in claim 7, wherein the command instructs the graphics device driver to cause a bit block transfer to occur along with the performance of the ProcAmp adjustment on the video.

9. The one or more electronically-accessible media as recited in claim 7, wherein the command instructs the graphics device driver to cause a bit block transfer to occur along with the performance of the ProcAmp adjustment to create one image for an entire screen of a display device, the one image stored in memory as a single block and including a frame of the video after the ProcAmp adjustment.

10. The one or more electronically-accessible media as recited in claim 5, wherein the command stipulates at least one control property value or change to a control property value for the ProcAmp adjustment on the video.

11. The one or more electronically-accessible media as recited in claim 5, comprising the electronically-executable instructions that, when executed, precipitate a further action comprising:
receiving at the video renderer an operation request from an instigating application, the operation request including a request to perform a ProcAmp adjustment on the video.

12. The one or more electronically-accessible media as recited in claim 5, comprising the electronically-executable instructions that, when executed, precipitate a further action comprising:
issuing a command from the video renderer towards the graphics device driver to close a ProcAmp stream object.

13. The one or more electronically-accessible media as recited in claim 5, wherein the actions of receiving a query and sending the response are effectuated, at least partially, by propagating the query and the response between the video renderer and the graphics device driver using at least one of a graphic interface and a device driver interface.

14. The one or more electronically-accessible media as recited in claim 5, wherein at least a portion of the electronically-executable instructions comprises at least part of an operating system.

15. The one or more electronically-accessible media as recited in claim 5, wherein at least a portion of the electronically-executable instructions comprises at least part of a graphics device driver.

16. The one or more electronically-accessible media as recited in claim 5, wherein the ProcAmp control properties are selected from a group comprising: none, brightness, contrast, hue, and saturation.

17. The one or more electronically-accessible media as recited in claim 5, wherein the values are selected from a group comprising: range, maximum, minimum, step size/increment, and default.

18. The one or more electronically-accessible media as recited in claim 5, wherein the one or more video processing operations that may be performed simultaneously with ProcAmp adjustments include at least one video processing operation selected from a plurality of video processing operations comprising: a YUV-to-RGB conversion operation, a stretch X operation, a stretch Y operation, a sub-rectangle region operation, an alphablend operation, and none.

19. A system for facilitating interaction between a video renderer and a graphics device driver, the system comprising:
a processor;
video rendering logic adapted to prepare queries that request information relating to process amplifier (ProcAmp) capabilities that can be applied to video to be displayed, wherein the queries include a description of the type of video that is to be displayed; and
graphics device driving logic adapted to prepare responses that indicate what ProcAmp capabilities can be applied to video to be displayed based on the description of the type of video to be displayed; and
interface logic that is adapted to facilitate interaction between the video rendering logic and the graphics device driving logic, the interaction comprising:
receiving a query at a graphics device driver from a video renderer, the query comprising:
a request for information relating to process amplifier (ProcAmp) control property capabilities; and
the description of the type of video to be displayed;
generating, based on the description of the video to be displayed, a response that includes the requested information that relates to ProcAmp control property capabilities;
sending the response to the video renderer from the graphics device driver;
providing to the video renderer from the graphics device driver, ProcAmp adjustments that may be performed simultaneously with video processing operations associated with the ProcAmp control properties;
selecting, at the video renderer, a ProcAmp control property associated with one of the ProcAmp control property capabilities;
receiving at the graphics device driver, from the video renderer, a request for values associated with the selected ProcAmp control property;
providing values to the video renderer in response to the request for values associated with the selected ProcAmp control property, the values being used in video processing operations;
receiving at the graphics device driver from the video renderer, a command to open a ProcAmp stream object;
opening the ProcAmp stream object;
sending to the video renderer, from the graphics device driver, another response having a handle pointing to the opened ProcAmp stream object;
receiving at the graphics device driver, from the video renderer, a command to perform a ProcAmp adjustment; and
causing performance of the ProcAmp adjustment, wherein:
the command includes an instruction to perform a video processing operation associated with the selected ProcAmp control property concurrently with the ProcAmp adjustment;
causing performance of the ProcAmp adjustment comprises causing a concurrent performance of the ProcAmp adjustment and the video processing operation; and
the information relating to ProcAmp control property capabilities is directed to video processing operations that are performed simultaneously with the ProcAmp adjustments.

* * * * *